G. P. HERRICK.
MACHINE FOR CUTTING GLASS.
APPLICATION FILED AUG. 10, 1916.
1,226,659.
Patented May 22, 1917.
2 SHEETS—SHEET 1.
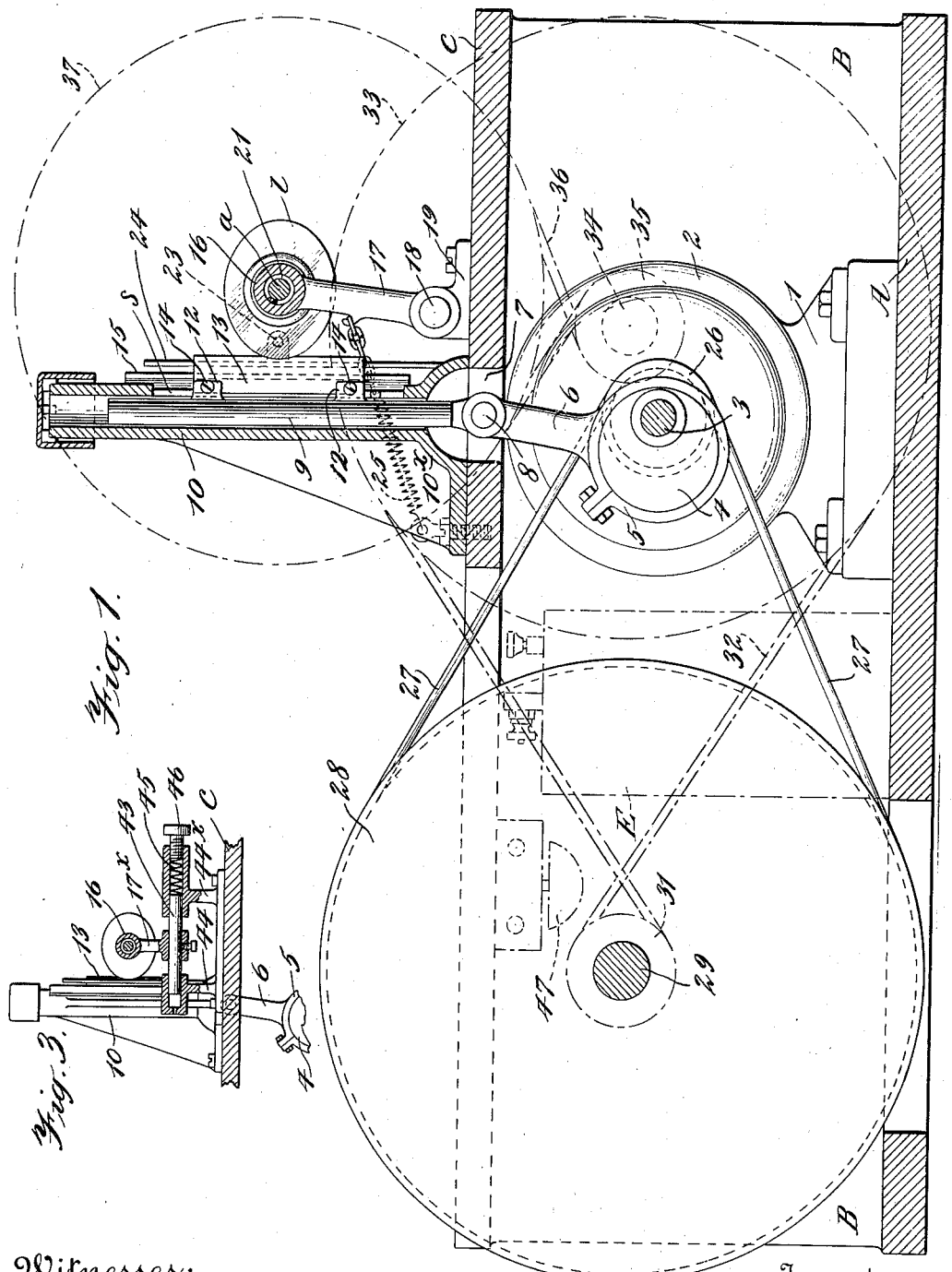
Witnesses:
Inventor
Gerardus P. Herrick
By his Attorneys

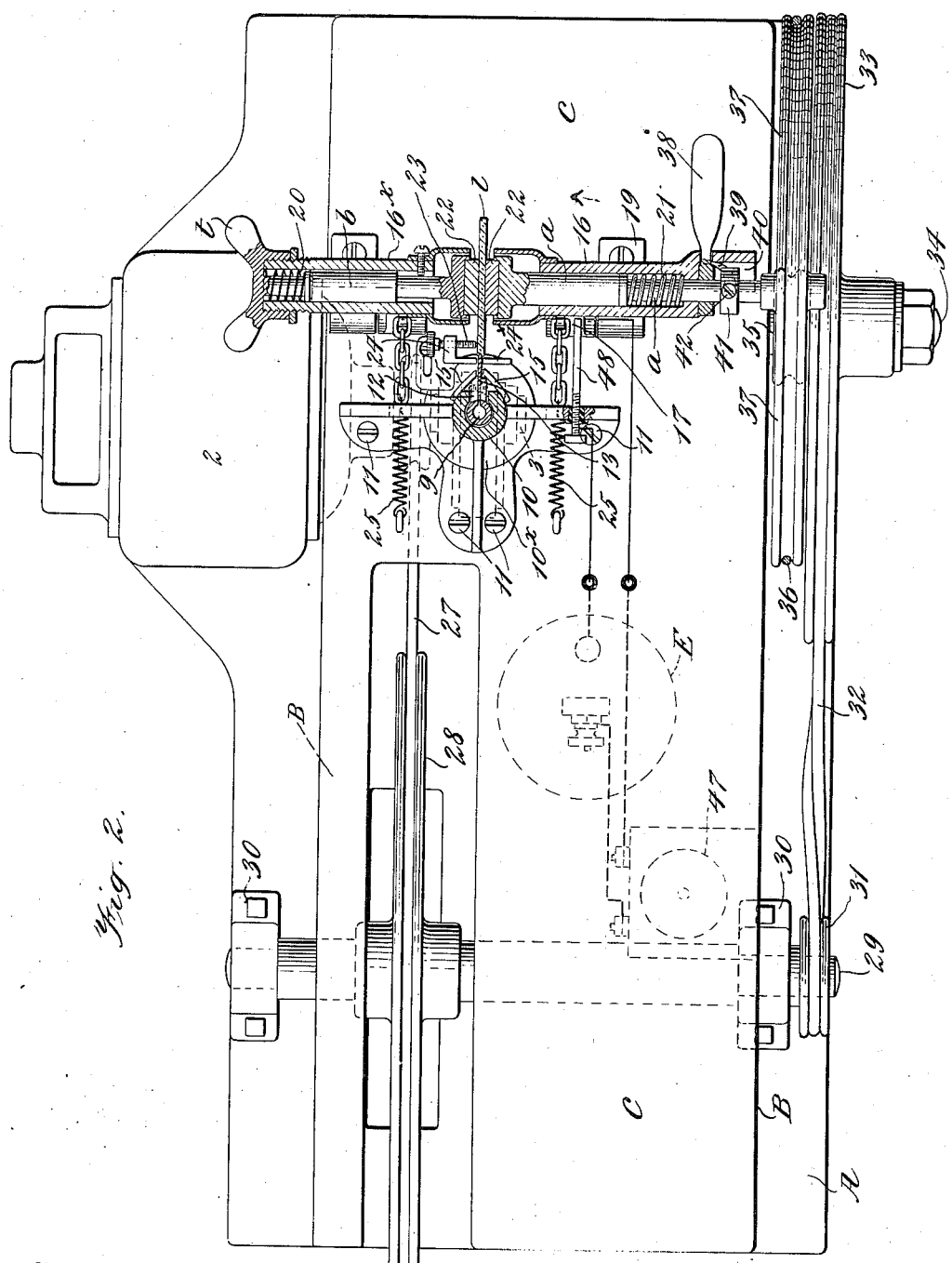

UNITED STATES PATENT OFFICE.

GERARDUS POST HERRICK, OF NEW YORK, N. Y.

MACHINE FOR CUTTING GLASS.

1,226,659.  Specification of Letters Patent.  Patented May 22, 1917.

Application filed August 10, 1916. Serial No. 114,120.

*To all whom it may concern:*

Be it known that I, GERARDUS POST HERRICK, a citizen of the United States, residing at New York city, borough of Manhattan, in the county of New York and State of New York, have invented certain new and useful Improvements in Machines for Cutting Glass, of which the following is a specification.

This invention relates to improvements in machines for cutting glass, and has for its object to provide a machine employing a reciprocating cutter, in conjunction with a holder for the article so arranged as to automatically present the portion to be cut to the cutting edge of the cutter, means also being provided for automatically stopping the cutting action at a predetermined point.

The embodiment of the invention herein illustrated and described is adapted to cut a groove in the periphery of a lens, for the purpose of securing the lens to a mounting.

I am aware that the edges of lenses have been filed and ground by various apparatus, including machines employing rotating disks. In the use of the said machines, however, with a cutting agent consisting of a pulverized abradant placed upon the edges of the disk, centrifugal action tends to throw off the abradant, and, furthermore, the abradant initially distributed about the entire edge of the disk rapidly masses at the work, and as it increases in weight falls from the disk at the point in question. The said defects of the rotary cutter or abradant carrier are obviated by the present improvements, which embody a reciprocating cutter, the latter by its movement in opposite directions tending to redistribute the abradant whenever it masses at any point.

In the accompanying drawings, Figure 1 is a longitudinal sectional elevation of a machine embodying the improvements;

Fig. 2 is a sectional plan view of the machine, and,

Fig. 3 is a view illustrating a modification of the means for supporting the lens or other article.

The machine frame comprises the bed plate A, upright standards B and table C.

Secured upon the bed A is the base 1 of an electric motor 2 or other source of power serving to rotate the cutter-actuating shaft 3. Shaft 3 is provided with an eccentric 4, embraced by the strap 5 of an eccentric rod 6 projecting upwardly through an opening 7 formed in the table C, and pivotally connected at 8 with cutter piston 9. The cutter piston 9 reciprocates within a sleeve 10 projecting upwardly from the table C and formed with a base portion $10^{\times}$ secured to the table by means of the screws 11.

The cutter piston 9 is formed as a tubing having radially-projecting spaced parallel lips 12 embracing the rear edge of the cutter blade 13, and securing the said blade by means of set screws 14. The cutter blade reciprocates through a slot $s$ formed in sleeve 10. Dust shields, indicated at 15 in Fig. 2, may be provided for closing the slot $s$ in the sleeve 10 against the admission of dust or grit.

The lens holder shown *per se* is a compound friction-interengaged shaft, given rotary movement during the reciprocation of the cutter blade. The member $a$ of the compound shaft is housed in a horizontally-disposed bearing sleeve 16 at the upper end of an arm 17, pivoted at 18 upon a bracket 19 secured upon the table C. The shaft member $b$ is housed in a bearing sleeve $16^{\times}$ similar to bearing sleeve 16, and like the latter is carried at the upper end of an arm pivotally supported upon the table C, and rigidly connected with arm 17, if desired. The members of the compound shaft are spring-pressed toward each other, the member $b$ being forwardly impelled by a light spring 20, and the member $a$ being forwardly impelled by a heavy spring 21, the arrangement being such that the lens L inserted between yielding friction blocks 22, one at the end of each shaft member, will be moved in the direction of the arrow (Fig. 2) until its face meets a positioning stop screw 23 carried by a bracket 24 adjustably mounted upon the table C or upon any suitable support or, when no lens is in position, the shaft members will be limited by their respective stops.

The tension of spring 20 may be regulated by manipulating cap $t$ which serves to confine the spring in the bearing sleeve 16˟.

The lens, whatever its shape may be, is maintained in engagement with the cutter blade 13 by means of springs 25, connected with the swinging arm 17 of the lens holder.

Means are provided for adjusting the depth of cut, and to this end the bracket 24 is provided with an angular arm 24˟ extending transversely of the cutter and formed with a slot to receive the latter. The walls of the said slot in the arm 24˟ are in line with the edge of the lens, so that when the cut in the lens reaches the maximum permitted by the adjustment of bracket 24, the edge of the lens will be brought against arm 24˟, the further movement of the lens toward the cutter thus being stopped.

The compound shaft with the lens clamped between its sections is rotated through the following instrumentalities: Clamped upon cutter-actuating shaft 3 is a belt pulley 26 connected by means of belt 27 with a large belt pulley 28 mounted on shaft 29, the latter being journaled in suitable bearing members 30 supported by the standards B. Shaft 29 carries a second belt pulley 31 connected by belt 32 with the large pulley 33 journaled on shaft 34. Shaft 34 is provided with a second pulley 35 connected by means of belt 36 with a pulley 37 carried at the outer end of shaft section $a$. Through the above driving connections the compound shaft imparts a relatively slow rotary movement to the lens simultaneously with the rapid reciprocation of the cutter blade.

A lever is provided for retracting one of the shaft sections when it is desired to place a lens in clamping position or to remove a completed lens from the machine. The lever 38 is loosely mounted upon shaft section $a$ and projects through a cam slot 39 formed in the extension 40 of bearing sleeve 16, so that when moved downwardly the walls of said slot will cause the lever to shift laterally against a collar 41 clamped at 42 upon the shaft section, the continued downward movement of the lever forcing the shaft section rearwardly against the pressure of spring 21.

In Fig. 3 I have illustrated a modification of the lens-holding device, the said modification being desirable in the grooving of lenses of irregular shape. In the modification, the supporting arms 17˟ (one only being shown) for the horizontal bearing sleeves 16 are each clamped upon a slide rod 43 mounted for endwise movement in the sockets of one of two sets of spaced bracket members 44, 44˟, fixed upon the table C, the socket of each member 44˟ also inclosing a coil spring 45 tending to move the lens holder toward the cutting blade 13, the tension of the spring being adjusted by stud screw 46. The arms 17˟ may be rigidly connected, if desired. In the modification, the tendency of the reciprocating cutter 13 to throw the lens and its mounting outwardly is practically the same on both up and down strokes, whereas in the lens-supporting device illustrated in Fig. 1, the tendency of the cutter to throw the lens and its mounting outwardly is increased on its up stroke.

Means are provided for automatically signaling the operator when a lens grooving operation is completed. In the embodiment of the invention herein illustrated and described the signal is a bell 47 connected with battery E, with an adjustable contact stud 48 carried by bracket 10˟ and with horizontal bearing sleeve 16 of the lens holder, the battery circuit being closed to ring the bell when at the completion of a grooving operation, as determined by the position of the angular arm 24˟ of bracket 24, bearing sleeve 16 moves into contact with the adjustable contact stud 48, as will be understood without further explanation. A semaphore or the like may be substituted for the bell.

What I claim and desire to secure by Letters Patent of the United States is:—

1. In a machine of the character described, a rotary clamp, a cutter member, means for imparting reciprocatory movements to said cutter member, and means for relatively moving the work clamp and cutter member transversely of the path of reciprocation of the latter.

2. In a machine of the character described, a rotary work clamp, a cutter member, means for imparting reciprocatory movements to said cutter member, means for relatively moving the work clamp and cutter member transversely of the path of reciprocation of the latter, and means for automatically stopping said relative movement when a predetermined depth of cut is produced in the work.

3. In a machine of the character described, a reciprocatory cutter member and actuating means therefor, a work holder, means for rotating the work holder, and supporting means for the work holder permitting a movement of the latter transversely of the cutter member, said supporting means including a bracket formed with a bearing boss, a shaft slidably mounted in said bearing boss and spring-pressed toward the cutter member, and means for rigidly connecting the work holder to said shaft.

4. In a machine of the character described, a tubular bearing, a reciprocatory piston mounted in said tubular bearing, a cutter blade carried by said piston and projecting through a slot in the tubular bearing, actuating means for said piston, a work holder comprising separable members spring-impelled toward each other and rotatory in unison, means adapted to rotate the work holder, and means for moving the work holder transversely of the cutter blade.

In testimony whereof I have hereunto signed my name in the presence of two subscribing witnesses.

GERARDUS POST HERRICK.

Witnesses:
M. E. McNinch,
M. A. Thomson.